April 18, 1933. S. R. BOLLES 1,904,196
APPARATUS FOR TREATING HYDROCARBONS
Filed Jan. 18, 1928
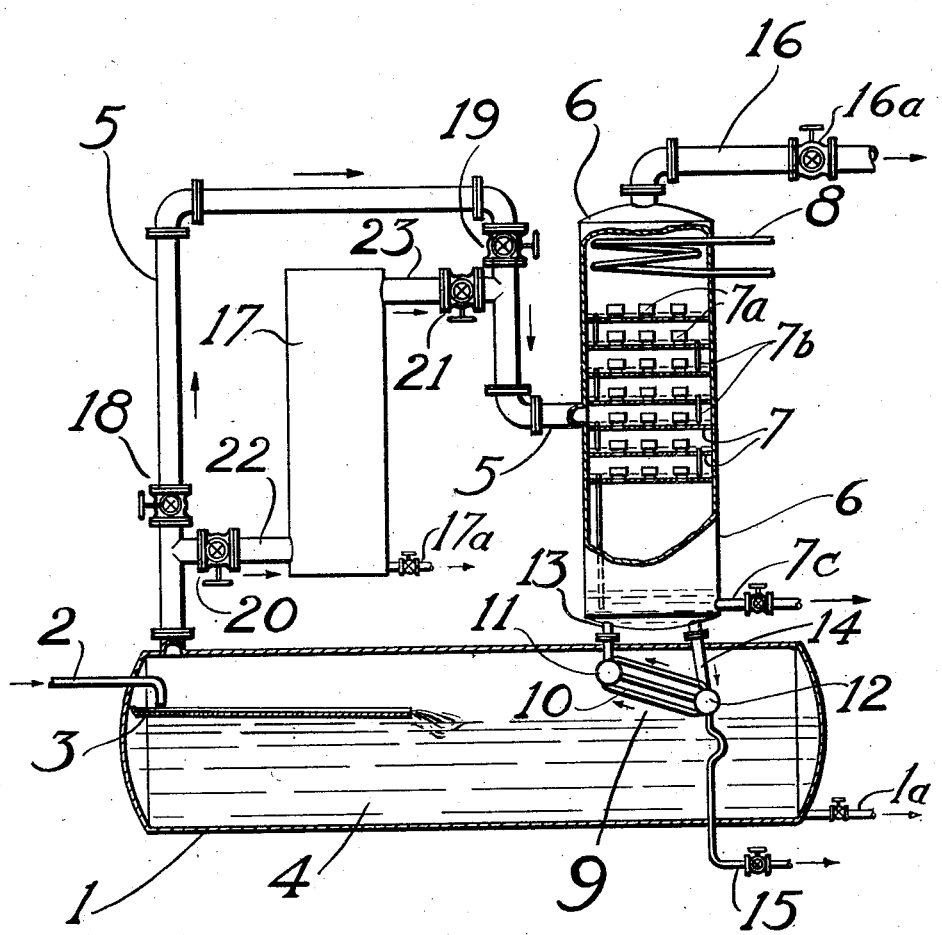
Seward R. Bolles Inventor
By his Attorney Patented Apr. 18, 1933                                                                              1,904,196

UNITED STATES PATENT OFFICE

SEWARD R. BOLLES, OF ELIZABETH, NEW JERSEY, ASSIGNOR TO STANDARD OIL DEVELOPMENT COMPANY, A CORPORATION OF DELAWARE

APPARATUS FOR TREATING HYDROCARBONS

Application filed January 18, 1928. Serial No. 247,517.

This invention relates to the art of distillation, more particularly to the fractional distillation of hydrocarbons and will be fully understood from the following description, read in conjunction with the accompanying drawing, which is a vertical cross-section of a preferred embodiment of my invention.

Heated oil and/or vapors from a pipe still, reaction chamber or other source, not shown, are introduced into the vapor separating chamber 1 by the pipe 2. A baffle 3 may be provided in chamber 1 to distribute the material introduced. Vapors separate from the body of liquid 4 in chamber 1 and are conducted by vapor line 5 to a bubble tower or fractionating column 6. The vapor separating chamber is also provided with the usual draw-off connection 1a for removal of unvaporized liquid residue therefrom, and a draw-off line 7c is connected to column 6.

Any form of a fractionating column or fractionating zone may be used but I prefer to use a bubble tower equipped with the usual plates 7, provided with bubble caps 7a, overflow pipes 7b, and an outlet 7c for removal of liquid from the tower if desired, and cooling coil 8.

The fractionating column 6 is provided with a heater or reboiler indicated as a whole at 9 for heating the reflux condensate collecting in the bottom of tower 6.

Heater 9 comprises tubes 10 connecting the headers 11, 12 and adapted to contain liquid, which are in turn connected respectively with the lower portion of the tower by risers or conduits 13, 14 thus providing for circulation of the condensate by thermosiphonic action from the tower down through riser 14 to header 12 and thence through tubes 10, header 11 and riser 13 back to the tower. Light ends in the condensates are thereby vaporized and the vapors return to the tower 6 for further fractionation. Header 12 is provided with a draw-off line 15 for removal of liquid from the heater 9.

Vapors from tower 6 pass to a final condenser, not shown, by a vapor line 16 provided with a valve 16a for maintaining any desired pressure in the apparatus.

In the preferred form of my apparatus I have shown a partial condensing such as a primary bubble tower, dephlegmator, or knockout box, schematically designated at 17, whereby the vapors leaving the vapor separating chamber 1 may be subjected to a preliminary separation before entering the tower 6. In case the primary fractionating means is used, valves 18, 19 in vapor line 5 are closed and valves 20, 21 in vapor line 22, 23 are opened, thus directing the vapors through the primary separating means 17.

As a practical example of my invention cracked hydrocarbon material, principally in vapor phase as produced in cracking coil operation, is delivered at a temperature of approximately 680° F. through pipe 2 to the vapor separating chamber 1, preferably maintained under a pressure of 50 lbs. gauge and in which separation takes place, producing a tar residuum and vapors. The tar residuum is continuously or periodically drawn off through the valved pipe 1a. The vapors pass through vapor line 5 and primary fractionator 17 to the bubble tower 6. The amount of cooling produced by coil 8 is controlled to produce an overhead vapor consisting substantially of gasoline fractions, which pass off through the valved vapor line 16.

The condensate produced by the action of the coil 8 passes in a generally downward direction from plate to plate in countercurrent relationship to ascending vapors. Condensate collecting in the bottom of the tower 6 circulates down through the heater 9 where it is heated by the vapors and/or liquid in the vapor separating chamber and returns thence to the tower. A temperature of approximately 550 to 600° F. is maintained in the base of the tower. The reflux condensate collecting in the lower part of the primary fractionator 17 is withdrawn to any desired place of disposal by valved pipe 17a. Condensate in the base of tower 6 in excess of that necessary to maintain a predetermined liquid level therein is continuously or periodically withdrawn through the valved pipe 7c.

It will of course be understood that the temperatures and pressure here given are merely by way of illustration and that in different operations in which my invention may be used the temperatures and pressure will vary in accordance with the conditions of operation.

While I have described my invention by reference to certain specific details, it will be understood that all changes are contemplated which come within the spirit and scope of the invention.

I claim:

1. Apparatus for treating hydrocarbons, comprising a vapor separating chamber, a fractionating column communicating with the vapor space of the chamber and having an outlet for vapors, a thermosiphonic reboiler, and closed conduits connecting spaced portions of the thermosiphonic reboiler with the lower portion of the fractionating column to form with the fractionating means a reservoir for condensate, said reboiler being positioned within said vapor separating chamber.

2. Apparatus for treating hydrocarbons, comprising a vapor separating chamber, a fractionating column communicating with the vapor space of the chamber and having an outlet for vapors, a thermosiphonic reboiler positioned in said vaporizing chamber, and closed conduits connecting spaced portions of the thermosiphonic reboiler at varying levels with the lower portion of the fractionating column to form with the means a reservoir for condensate.

3. Apparatus for treating hydrocarbons, comprising a vapor separating chamber, a fractionating column communicating with the vapor space of said chamber and having an outlet for vapors, a thermosiphonic reboiler positioned within said chamber and comprising a pair of headers connected by one or more tubular conduits, one of said headers being positioned at a higher level than the other, and closed conduits connecting said headers with the lower portion of said fractionating column to form a reservoir for condensate.

4. Apparatus for treating hydrocarbons, comprising a vapor separating chamber, a fractionating column communicating with the vapor space of the chamber and having an outlet for vapors, a plurality of pipes inclined to the horizontal and positioned at least in part within said chamber, and conduits connecting opposite ends of the pipes with the lower portion of the fractionating column to form therewith a reservoir for condensate.

5. Apparatus for separating hydrocarbons, comprising a vapor separating chamber, partial condensing means, a vapor line leading from the vapor separating chamber and connected with the partial condensing means, a fractionating column, a line for drawing off condensate from said partial condensing means, means for conducting vapors from the partial condensing means to the fractionating column, and a thermosiphonic reboiler positioned within the vapor separating chamber and communicating with the column for heating condensate formed in the column.

SEWARD R. BOLLES.